United States Patent [19]

Im

[11] Patent Number: 5,768,168

[45] Date of Patent: Jun. 16, 1998

[54] UNIVERSAL GALOIS FIELD MULTIPLIER

[75] Inventor: Jin-Hyeok Im, Seoul, Rep. of Korea

[73] Assignee: LG Semicon Co., Ltd., Choongcheongbuk-Do, Rep. of Korea

[21] Appl. No.: 656,784

[22] Filed: May 30, 1996

[51] Int. Cl.$^6$ ............................... G06F 7/00; G06F 15/00
[52] U.S. Cl. ............................................. 364/746.1
[58] Field of Search .................... 364/746.1; 371/37, 371/40.1, 37.1

[56] References Cited

U.S. PATENT DOCUMENTS

| | | | |
|---|---|---|---|
| 4,697,248 | 9/1987 | Shirota | 364/754 |
| 4,763,330 | 8/1988 | Shimizu | 371/37 |
| 4,875,211 | 10/1989 | Murai et al. | 371/40.1 |
| 5,185,711 | 2/1993 | Hattori | 364/746.1 |
| 5,414,719 | 5/1995 | Iwaki et al. | 371/37.1 |
| 5,502,665 | 3/1996 | Im | 364/746.1 |
| 5,537,426 | 7/1996 | Lee | 371/37.1 |

FOREIGN PATENT DOCUMENTS

| | | |
|---|---|---|
| 0265180 | 4/1988 | European Pat. Off. . |
| 0265336 | 4/1988 | European Pat. Off. . |
| 0333599 | 9/1989 | European Pat. Off. . |
| 0654732 | 5/1995 | European Pat. Off. . |
| 9120028 | 12/1991 | WIPO . |

*Primary Examiner*—Reba I. Elmore
*Assistant Examiner*—Monica Lewis

[57] ABSTRACT

A universal Galois field multiplier which is adaptable to any form of polynomial having a predetermined n-order when it is controlled by a coefficient of polynomial which defines a Galois field, which includes second AND-gates each for ANDing a corresponding bit value of the multiplicand and one bit value among the remaining bits of the multiplier; first XOR-gates each for XORing a corresponding leftwardly rotated output value of the second AND-gates and a corresponding output value of the preceding operation unit; third AND-gates each for ANDing the corresponding coefficient value of the generating polynomial and a most significant bit value among the output values of the preceding operation unit; and second XOR-gates for XORing output values of the third AND-gates and the first XOR-gates, wherein the second XOR-gates become effective in accordance with outputs of the third AND-gates.

16 Claims, 6 Drawing Sheets

UNIVERSAL GALOIS FIELD MULTIPLIER

BACKGROUND OF THE INVENTION

1. Field of the Invention

The present invention relates to a circuit for performing a multiplication operation of a universal Galois field having a $2^n$ number of elements, and particularly to a circuit for performing a multiplication operation in a universal Galois field which is controlled in accordance with a coefficient of a generating polynomial which defines the Galois field and is adaptable to any type of the generating polynomial corresponding to a predetermined element "n".

2. Description of the Conventional Art

When storing, transmitting, or receiving a digital signal, a certain error may occur, and there is limitation in preventing the error due to a predetermined factor such as a quantization noise which exists in nature. Therefore, it is impossible to develop a certain device without consideration on the above-mentioned problems. That is, the above-mentioned error and problems are considered as factors for detecting and correcting the same in accordance with a predetermined algorithm.

So as to detect and correct the above-mentioned error, an error correction code is generally used in the industry. An encoding and decoding operation of an error correction code is embodied based on the operation theory relating to a Galois field.

Meanwhile, an error correction code is a set of a finite field which enables the four arithmetical operations and is closed for the four arithmetical operations. Such a finite field is generally called a "Galois field". In order to establish four arithmetical operation among finite elements of the Galois field and close the Galois field for the four arithmetical operations, the four arithmetical operations for the Galois field are defined differently from the general four arithmetical operations.

Since most of the current digital logic circuit is operated based on a binary scale, the Galois field is expressed as "$GF(2^n$, where $n=1,2,3,\ldots$) . For example, there is a predetermined form of Galois fields such as GF(2), GF(4), GF(8), GF(16), GF(32), ..., GF(256). That is, the Galois field is expressed as a form of GF(N) having N-number of elements.

Therefore, the Galois field corresponding to 4-bit, 7-bit, 8-bit, 12-bit, 16-bit, etc, are expressed as GF(16), GF(128), GF(256), GF(4096), GF(65536), etc.

The four arithmetical operations can be defined in a finite element of a Galois field, and the four arithmetical operations should have another form different from the conventional form of the four arithmetical operations so that the Galois field can have a closed environment with respect to the four arithmetical operations.

In the Galois field, one(1) and one(1) may make zero(0), not two(2), and in another Galois field, one(1) and two(2) may make zero(0). That is, in accordance with the number of elements of a set and the definition of the four arithmetical operations, a corresponding characteristic of the Galois field differs. A generating polynomial of a Galois field is introduced so as to define the characteristic of the Galois field.

For example, a generating polynomial G1(X) ($G1(X)=X^8+X^4+X^3+X^2+1$) and another generating polynomial of G2(X) ($G2(X)=X^8+X^7+X^2+X+1$) can be both used for defining a Galois field GF(256), however, the both have a different characteristic.

In the Galois field GF(N), an addition operation is defined as an exclusive OR (hereinafter called "XOR") operation, a subtraction operation is defined as the addition operation, and a dividing operation is embodied by an inversion table and a multiplication operation. Therefore, the redefinition of the four arithmetical operation in the Galois field is based on how to properly define a multiplication operation.

FIG. 1 shows a multiplier for a conventional Galois field GF(16) which is defined by the generating polynomial G3(X) ($G3(X)=X^4+X+1$) and which includes AND-gates AD1 through AD4 for ANDing bits of multiplicands A3, A2, A1, and A0 and a most significant bit (MSB) B3 of multipliers B3, B2, B1 and B0. Two elements of the Galois field GF(16) are expressed in four (4) bits, the multiplicands A3, A2, A1 and A0 and the multipliers of B3, B2, B1 and B0. The AND-gates AD5 through AD8 are or ANDing bits of the multiplicands A3, A2, A1 and A0 and the second most significant bit B2 of the multipliers B3, B2, B1 and B0.

The XOR-gates XOR1 through XOR4 of FIG. 1 are for XORing leftwardly rotated output values of AND-gates AD1 through AD4 and output values of the AND-gates AD5 through AD8. An XOR-gate XOR5 is are for XORing an output value of an XOR-gate XOR2 positioned at a remaining term (X) when removing the highest order term ($X^4$) and the lowest order term (1) from the generating polynomial G3(X) and an output value of the AND-gate AD4.

The AND-gates AD9 through AD12 are ANDing bits of the multiplicands A3, A2, A1, and A0 and the third most significant bit B1 of the multipliers B3, B2, B1, and B0. XOR-gates XOR6 through XOR9 are for XORing leftwardly rotated output values of the XOR-gates XOR1, XOR5, XOR3, and XOR4 and output values of the AND-gates AD9 through AD12. An XOR-gate XOR10 is for XORing an output value of an XOR-gate XOR7 positioned at the remaining term (X) and an output value of the XOR-gate XOR4. AND-gates AD13 through AD16 for ANDing bits of the multiplicands of A3, A2, A1, and A0 and the least significant bit B0 of the multipliers B3, B2, B1 and B0. XOR XOR11 through XOR14 are for XORing leftwardly rotated output values of the XOR-gates XOR6, XOR10, XOR8, and XOR9 and output values of the AND-gates AD13 through AD16. An XOR-gate XOR15 is for XORing an output value of an XOR-gate XOR12 positioned at the remaining term (X) and an output value of the XOR-gate XOR9.

The operation of the conventional Galois field multiplier will now be explained with reference to the accompanying drawings.

To begin with, in the Galois field GF(16) defined by a generating polynomial G3(X), the characteristic of a multiplication is described as follows.

The expressions "X=2, $X^2=4$, $X^3=8$, and $1+1=0$, $X+X=0$, $X^2+X^2=0$, $X^3+X^3=0$, and $X^4=X+1$" can be obtained when substituting the above-mentioned expressions with G3(X) in accordance with an operation theory of a Galois field. That is, since a rounding-off is not considered in the addition operation of the Galois field, the expression of G(X)=0 can be established, so that the order of the highest order term is made lower. That is, in the generating polynomial G3(X), an expression $X^4=X+1$ can be satisfied, and $X^4$ can be substituted with "X+1".

For example, "7×8" is operated as follows:
$7\times8=(4+2+1)\times8=(X^2+X+1)\times X^3=X^5+X^4+X^3=X^4(X+1)+X^3=(X+1)(X+1)+X^3=X^2+X+X+1+X^3=X^3+X^2+1=8+4+1=13=D_{16}$.

The multiplication operation of the multiplicands ($a_3\, a_2\, a_1\, a_0$) and the multipliers ($b_3\, b_2\, b_1\, b_0$) which are expressed as four (4) bits are performed by the following example 1.

Example 1)

|   | $a_3$ | $a_2$ | $a_1$ | $a_0$ |   |   |
|---|---|---|---|---|---|---|
| x | $b_3$ | $b_2$ | $b_1$ | $b_0$ |   |   |
|   | $a_3b_3$ | $a_2b_3$ | $a_1b_3$ | $a_0b_3$ |   | $R_1$ |
|   |   | $a_3b_2$ | $a_2b_2$ | $a_1b_2$ | $a_0b_2$ | $R_2$ |
|   |   |   | $a_3b_1$ | $a_2b_1$ | $a_1b_1$ | $a_0b_1$ |
| + |   |   |   | $a_3b_0$ | $a_2b_0$ | $a_1b_0$ $a_0b_0$ |
|   |   | $a_2b_3$ |   |   |   | $a_1b_0$ $a_0b_0$ |
|   | $a_3b_3$ | $a_3b_2$ |   |   | + | $a_1b_0$ |

That is, the operation value of the first row $R_1$ and the operation of the second row $R_2$ are added. Here, when the second row $R_2$ is a base, since the highest order $a_3b_3$ of the first row $R_1$ is positioned at $X^4$, $X^4$ can be substituted with $X+1$, and the thusly substituted value is added to the second row $R_2$.

Therefore, the addition operation of the first row $R_1$ and the second row $R_2$ are performed by the following example 2.

Example 2)

|   | $a_3b_3$ | $a_2b_3$ | $a_1b_3$ | $a_0b_3$ |   | $R_1$ |
|---|---|---|---|---|---|---|
| + |   | $a_3b_2$ | $a_2b_2$ | $a_1b_2$ | $a_0b_2$ | $R_2$ |
|   | $a_2b_3$ | $a_1b_3$ | $a_0b_3$ | $a_3b_3$ |   |   |
|   | + $a_3b_2+a_2b_2+a_1b_2+a_0b_2$ |   |   |   |   |   |
|   | + $a_2b_3$ |   |   |   |   |   |

The operation process (example 2) is directed to leftwardly rotating the terms of the first row $R_1$ ($a_3b_3$ $a_2b_3$ $a_1b_3$ $a_0b_3$), and the thusly rotated terms are added to the second row $R_2$ ($a_3b_2$ $a_2b_2$ $a_1b_2$ $a_0b_2$), and the highest order term $a_3b_3$ of the first row $R_1$ is added to the second term $a_0b_3+a_1b_2$ of the thusly added result.

Here, the reason for adding the highest order term $a_3b_3$ of the first row $R_1$ to the second term $a_0b_3+a_1b_2$ is because of the generating polynomial G3(X) (G3(X)=$X^4$+X+1). That is, when removing the highest order term $X^4$ and the lowest order term 1 from the generating polynomial G3(X), the remaining term is a term X , and since the second term $a_0b_3+a_1b_2$ is positioned at the same place as the term X, the highest order term $a_3b_3$ of the first row $R_1$ is added thereto.

When the values of the multiplicands A4 through A1 and the multipliers B4 thorough B1 have a value of "1111", respectively, the operation of the conventional Galois field multiplier is explained as follows.

Since two inputs of the AND-gate AD1 through AD4, AD5 through AD8, AD9 through AD12, and AD13 through AD16 are all one (1), the outputs of the AND-gates AD1 through AD4, AD5 through AD8, AD9 through AD12, and AD13 through AD16 all become one (1). Thereby, the output of the XOR-gates XOR1 through XOR4 is zero (0), the output of the XOR-gate XOR5 is one (1), the outputs of the XOR-gates XOR6, XOR7, XOR9, and XOR10 is one (1), the output of the XOR-gate XOR8 is zero (0), the outputs of the XOR-gates XOR11 through XOR13 are all zero (0), and the outputs of the XOR-gate XOR14 and XOR15 are all one (1), so that the final result of the multiplication operation has a value of "1010".

Meanwhile, when rewriting the multiplication operation with respect to the multiplicands A4 through A1 having the value of "1111" and the multiplier B4–B1 having the value of "1111" in accordance with the Galois field theory of an expression of G(X)=$X^4$+X+1, $2^1$=X, $2^2$=$X^2$, $2^3$=$X^3$, $2^4$=X+1, the following result can be obtained thereby.

$X^{12}$=$(X^4)^3$=$(X+1)^3$=$(X+1)^2(X+1)$=$(X^2+X+X+1)$ $(X+1)$= $(X^2+1)$ $(X+1)$=$X^3+X^2+X+1$, and A=B =$X^{12}$=$2^{12}$, $2^{12}$× $2^{12}$=$2^{24}$=$2^{15}$×$2^9$=1×$(X^3+X)$=$X^3+X$ since $X^{12}X^3$=$(X^3+ X^2+X+1)X^3$=$X^6+X^5+X^4+X^3$=$X^4(X^2+X+1)$+$X^3$=(X+1) $(X^2+X+1)$+$X^3$=$X^3+X^2+X+1+X^3$=1, and $2^9$=$X^9$= $X^4X^4X$=(X+1) (X+1)X=$(X^2+X+X+1)X$=$(X^2+1)X$= $X^3+X$.

Therefore, the result $(X^3+X)$ coincides with the operation value of "1010" which is obtained based on the circuit of the Galois field multiplier.

However, the conventional Galois field multiplier is directed to a specific system in accordance with a generating polynomial. That is, as shown in FIG. 1, the conventional Galois field multiplier can be used only for a Galois field GF(16) which is defined by the generating polynomial G3(X). However, it can not be used for the Galois field GF(16) which is defined by a generating polynomial G4(X) (G4(X)=$X^4X^3$+1).

As described above, since the use of the conventional Galois field multiplier is limited to a predetermined system which is defined by a generating polynomial, and the same can not be used for a system which is defined by the other polynomial, the conventional Galois field multiplier can not be used in a system which requires various generating polynomial such as a processor which is adapted for an error correction code.

SUMMARY OF THE INVENTION

Accordingly, it is an object of the present invention to provide a universal Galois field multiplier which overcome problems encountered in a conventional universal Galois field multiplier.

It is another object of the present invention to provide a universal Galois field multiplier which is adaptable to any form of polynomial having a predetermined n-order when it is controlled by a coefficient of polynomial which defines a Galois field.

To achieve the above objects, in accordance with a first embodiment of the present invention, there is provided a universal Galois field multiplier, which includes a first operation unit including first AND-gates for ANDing a corresponding bit value of a multiplicand and a most significant bit value of a multiplier; and a plurality of second operation units connected to the first operation unit or a preceding operation unit for logically operating a bit value of a multiplicand values from the second most significant bit to a least significant bit which are remaining bits of the multiplier in accordance with coefficient values of a generating polynomial which defines a Galois field, said second operation unit including: second AND-gates each for ANDing a corresponding bit value of the multiplicand and one bit value among the remaining bits of the multiplier; first XOR-gates each for XORing a correspondingly leftwardly rotated output value of the second AND-gates and a corresponding output value of the preceding operation unit; third AND-gates each for ANDing the corresponding coefficient value of the generating polynomial and a most significant bit value among the output values of the preceding operation unit; and second XOR-gates for XORing output values of the third AND-gates and the first XOR-gates, wherein the second XOR-gates become effective in accordance with outputs of the third AND-gates.

To achieve the above objects, in accordance with a second embodiment of the present invention, there is provided a universal Galois field multiplier which includes a first operation unit including first AND-gates for ANDing a corresponding bit value of a multiplicand and a most significant bit value of a multiplier; and a plurality of second operation units connected to the first operation unit or a preceding operation unit for logically operating a bit value of a multiplicand values from the second most significant bit to a least significant bit which are remaining bits of the multiplier in accordance with coefficient values of a generating polynomial which defines a Galois field, said second operation unit including: second AND-gates each for ANDing a corresponding bit value of the multiplicand and one bit value among the remaining bits of the multiplier; a first XOR-gate for XORing an output value of a second AND-gate among the second AND-gates and an output value of a preceding operation unit which is leftwardly rotated; third AND-gates for ANDing a coefficient value of the generating polynomial, and a most significant bit value among output values of the predetermined operation unit; and second XOR-gates each for XORing a corresponding output value of the third AND-gates, a corresponding output value of the second AND-gates, and a corresponding output value of a preceding operation unit which is leftwardly rotated.

To achieve the above objects, in accordance with a third embodiment of the present invention, there is provided a universal Galois field multiplier which includes a first operation unit including first AND-gates for ANDing a corresponding bit value of a multiplicand and a most significant bit value of a multiplier; and a plurality of second operation units connected to the first operation unit or a preceding operation unit for logically operating a bit value of a multiplicand values from the second most significant bit to a least significant bit which are remaining bits of the multiplier in accordance with coefficient values of a generating polynomial which defines a Galois field, said second operation unit including: second AND-gates each for ANDing a corresponding bit value of the multiplicand and one bit value among the remaining bits of the multiplier; first XOR-gates each for XORing a corresponding leftwardly rotated output value of the second AND-gates and a corresponding output value of the preceding operation unit; third AND-gates for ANDing a corresponding coefficient value of a generating polynomial and a most significant bit value among output values of a preceding operation unit when at least one term among opposing terms of generating polynomials which define a Galois field has a coefficient value of one (1); and second XOR-gates for XORing output values of the third AND-gates and the first XOR-gates, wherein the second XOR-gates become effective in accordance with outputs of the third AND-gates.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
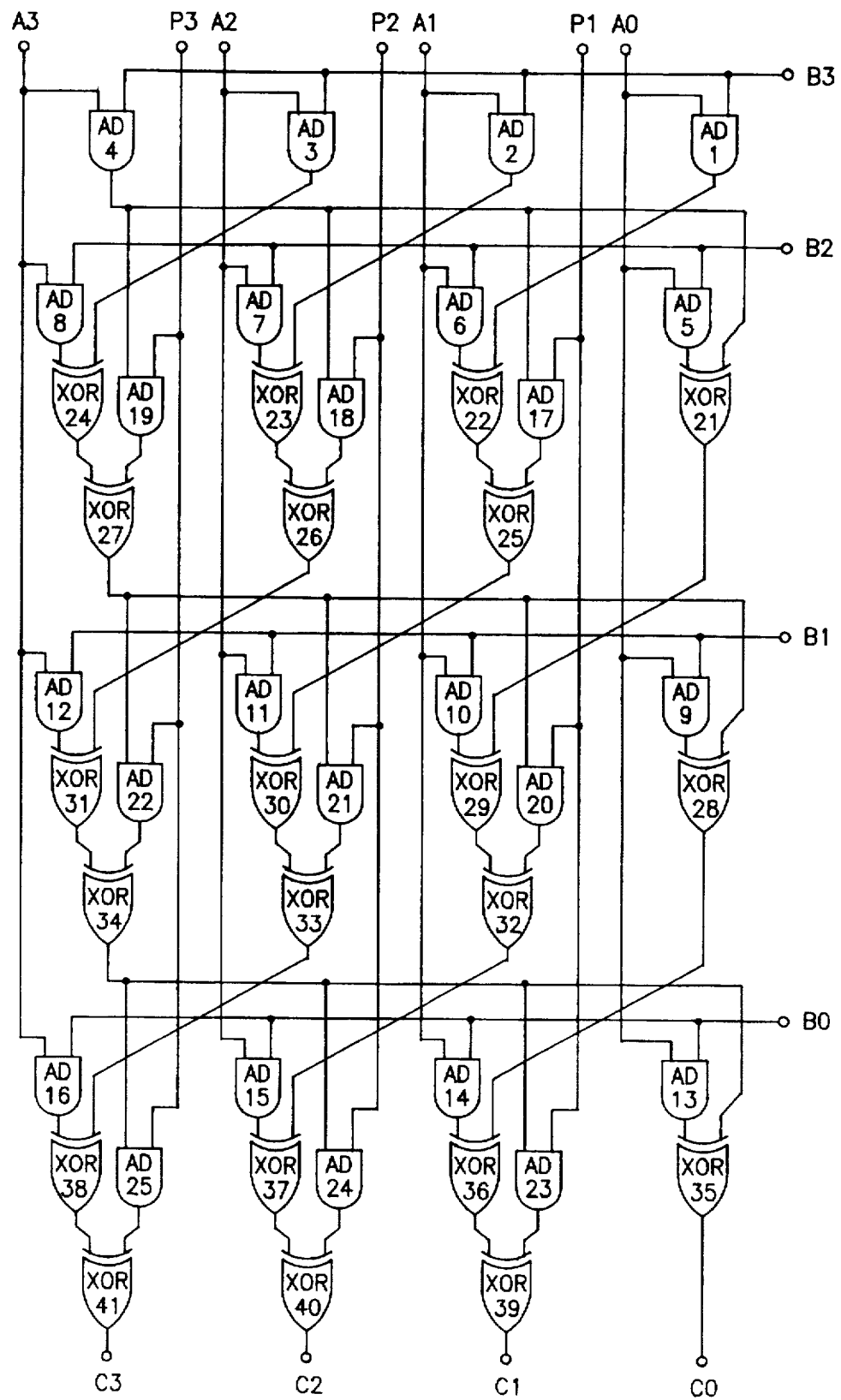
FIG. 2 is a circuit diagram of a universal Galois field multiplier for a Galois field GF(16) according to a first embodiment of the present invention.

FIG. 2 shows a universal Galois field multiplier according to a first embodiment of the present invention, which includes AND-gates AD1 thorough AD4 for ANDing bit values of multiplicands A3, A2, A1, and A0 and a most significant bit B3 of multipliers B3, B2, B1 and B0 when multiplicands A3, A2, A1, and A0 and multipliers B3, B2, B1, and B0. These which are elements of a Galois field GF(16) which is defined by a generating polynomial G5(X) (G5(X)=$X^4$+$P_3 X^3$+$P_2 X^2$+$P_1 X$+1) and can be expressed as four (4) bits. Coefficients $P_3$, $P_2$, and $P_1$ are for the remaining terms $X^3$, $X^2$, and X but not the highest order term $X^4$ and the lowest order term 1 from the generating polynomial G5(X). The universal Galois field multiplier of FIG. 2 also includes AND-gates AD5 through AD8 for ANDing bit values of the multiplicands A3, A2, A1, and A0 and the second most significant bit values B2 of the multipliers B3, B2, B1, and B0, XOR-gates XOR21 through XOR24 for XORing leftwardly rotated output values of the AND-gates AD1 through AD4 and output values of the AND-gates AD5 through AD8, AND-gates AD17 through AD19 for ANDing an output value of the AND-gate AD4 corresponding to the MSB among the output values of the AND-gates AD1 through AD4 and coefficients $P_3$, $P_2$, and $P_1$ of the generating polynomial G5(X), and XOR-gates XOR25 through XOR27 for XORing output values of the AND-gates AD17 through AD19 and output values of the XOR-gates XOR22 through XOR24.

FIG. 2 also includes AND-gates AD9 through AD12 for ANDing bit values of the multiplicands A3, A2, A1, and A0 and the third MSB B1 of the multipliers B3, B2, B1, and B0, XOR-gates XOR28 through XOR31 for XORing output values of the AND-gates AD9 through AD12 and leftwardly rotated output values of the XOR-gates XOR21, and XOR25 through XOR27, AND-gates AD20 through AD22 for ANDing an output value of the XOR-gate XOR27 (corresponding to the MSB among the output values of the XOR-gates XOR21 and XOR25 through XOR27) and coefficients $P_3$, $P_2$, and $P_1$ of the generating polynomial G5(X), and XOR-gates XOR32 through XOR34 for XORing output values of the AND-gates AD20 through AD22 and output values of the XOR-gates XOR29 through XOR31.

FIG. 2 also includes AND-gates AD13 through AD16 for ANDing bit values of the multiplicands A3, A2, A1, and A0 and the LSB B0 of the multipliers B3, B2, B1, and B0, XOR-gates XOR35 through XOR38 for XORing output values of the AND-gates AD13 through AD16 and leftwardly rotated output values of the XOR-gates XOR28 and XOR32 through XOR34, AND-gates AD23 through AD25 for ANDing an output value of the XOR-gate XOR34 (corresponding to the MSB among the output values of the XOR-gates XOR28 and XOR32 through XOR34 and coefficients $P_3$, $P_2$, and $P_1$ of the generating polynomial G5(X), and XOR-gates XOR39 through XOR41 for XORing output values of the AND-gates AD23 through AD25 and output values of the XOR-gates XOR36 through XOR38.

The result of the multiplication of the multiplicands A3, A2, A1, and A0 and the multipliers B3, B2, B1, and B0 is referred to a bits C0 through C3 outputted from the XOR-gates XOR35 and XOR39 through XOR41.

The operation and effects of the universal Galois field multiplier according to a first embodiment of the present invention will now be explained with reference to the accompanying drawings.

To begin with, when the coefficients $P_3$, $P_2$, and $P_1$ of a predetermined generating polynomial G5(X) (G5(X)=$X^4$+

Figure 1:
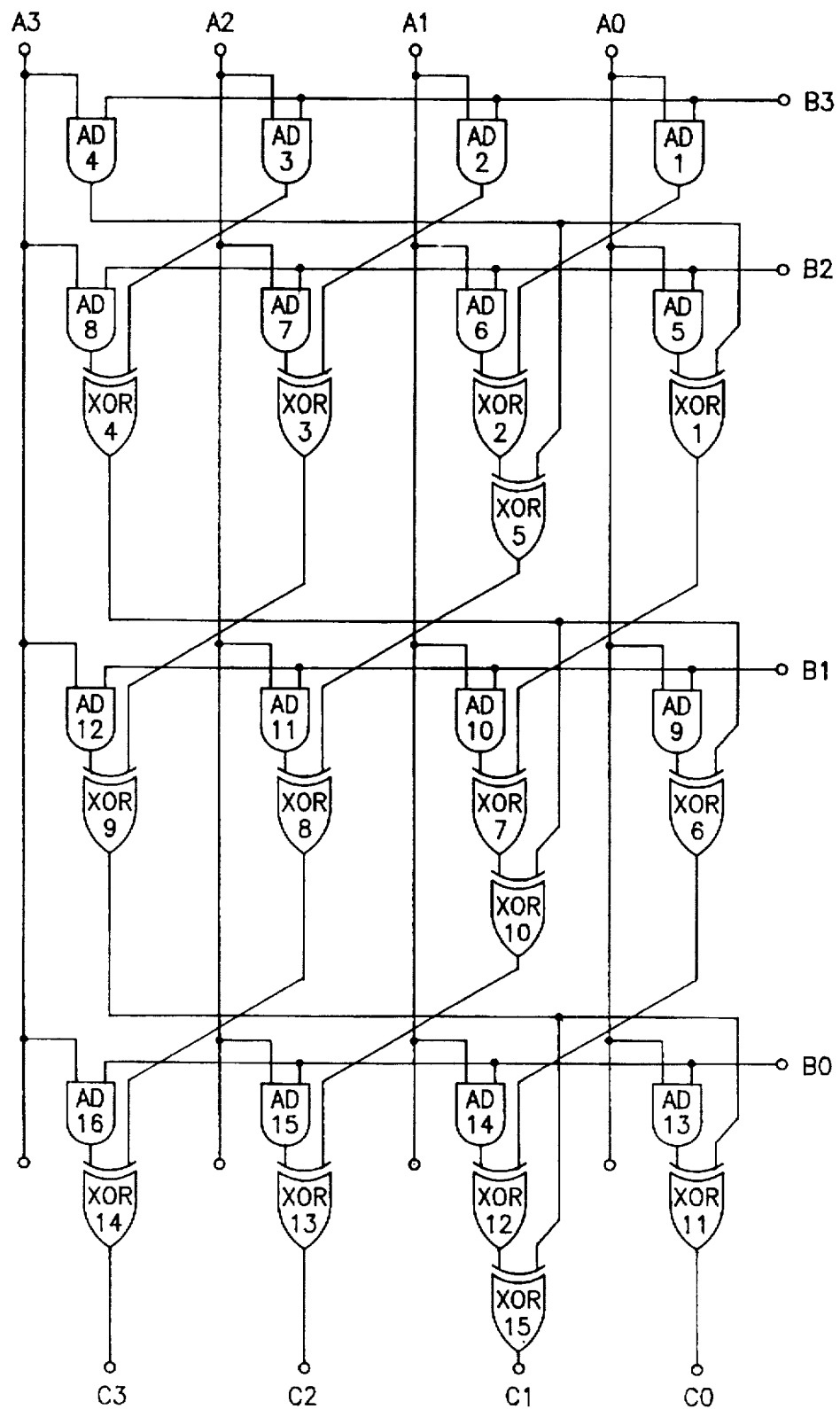
FIG. 1 is a circuit diagram of a conventional Galois field multiplier for a Galois field GF(16) which is defined by a polynomial G3(X) (G3(X)=$X^4$+X+1)

$P_3X^3+P_2X^2+P_1X+1$) has a value of "0, 0, 1", that is, when the generating polynomial G5(X) is referred to a generating polynomial G3(X) (G3(X)=$X^4$+X+1), the universal Galois field multiplier as shown in FIG. 2 has the same function as the Galois field multiplier as shown in FIG. 1.

That is, the AND-gates AD18 and AD19, AD21 and AD22, and AD24 and AD25 which receive values of coefficients $P_3$ and $P_2$ from one side respectively, output values of zero (0) irrespective of the values received from the other side. However, the AND-gates AD17, AD20, and AD23, which receive a coefficient $P_1$ from the one side, output the values inputted via the other side based on their input/output characteristic.

In addition, the XOR-gates XOR26 and XOR27, XOR33 and XOR34, and XOR40 and XOR41 which receive a value of zero (0) outputted from the AND-gates AD18 and AD19, AD21 and AD22, and AD24 and AD25 from one side output the value inputted via the other side based on their input/output characteristic.

That is, since only the XOR-gates XOR25, XOR32, and XOR39 positioned at a row corresponding to a bit A1 of a multiplicand among the AND-gates AD17 through AD25, and the XOR-gates XOR25 through XOR27, XOR32 through XOR34, and XOR39 through XOR41 generate predetermined output value in accordance with input values via both sides, the XOR-gates are considered to be effective. Therefore, the Galois field multiplier as shown in FIG. 2 outputs the same output values C0 through C3 as the Galois field multiplier as shown in FIG. 1.

Next, when the coefficients $P_3$, $P_2$, and $P_1$ of a predetermined generating polynomial G5(X) has a value of "1, 0, 0", that is, then the generating polynomial G5(X) can be referred to generating polynomial G4(X) (G4(X)=$X^4$+$X^3$+1), the universal Galois field multiplier as shown in FIG. 2 has the same function as the Galois field multiplier implemented by the same manner as that of FIG. 1 in accordance with the generating polynomial G4(X).

Referring to FIG. 1, when the XOR-gates XOR5, XOR10, and XOR15 are connected to a row corresponding to the bit A3 of a multiplicand, not to the row corresponding to a bit A1 of a multiplicand, the conventional Galois field multiplier corresponding to the generating polynomial G4(X) can be easily embodied.

Referring to FIG. 2, when coefficients $P_3$, $P_2$, and $P_1$ having the values "1, 0, 0" are inputted, only the XOR-gates XOR27, XOR34, and XOR41 positioned at a row corresponding to a bit A3 of a multiplicand among the AND-gates Ad17 through AD25 and the XOR-gates XOR25 through XOR27, XOR32 through XOR34, and XOR39 through XOR41 can be considered to be effective gates in accordance with the inputted coefficients $P_3$, $P_2$, and $P_1$ of the values 0, 0, and 1. Therefore, the Galois field multiplier as shown in FIG. 2 generates the same output values C0 through C3 as the conventional Galois field multiplier corresponding to the generating polynomial G4(X).

The first embodiment of the present invention is directed to changing and inputting coefficients $P_3$, $P_2$, and $P_1$ of the generating polynomial G5(X) (G5(X)=$X^4$+$P_3X^3$+$P_2X^2$+$P_1X$+1), so that this embodiment can be used for a generating polynomial G3(X) (G3(X)=$X^4$+X+1) as well as a Galois field multiplier corresponding to a generating polynomial G4(X) (G4(X)=$X^4$+$X^3$+1).

Figure 3:
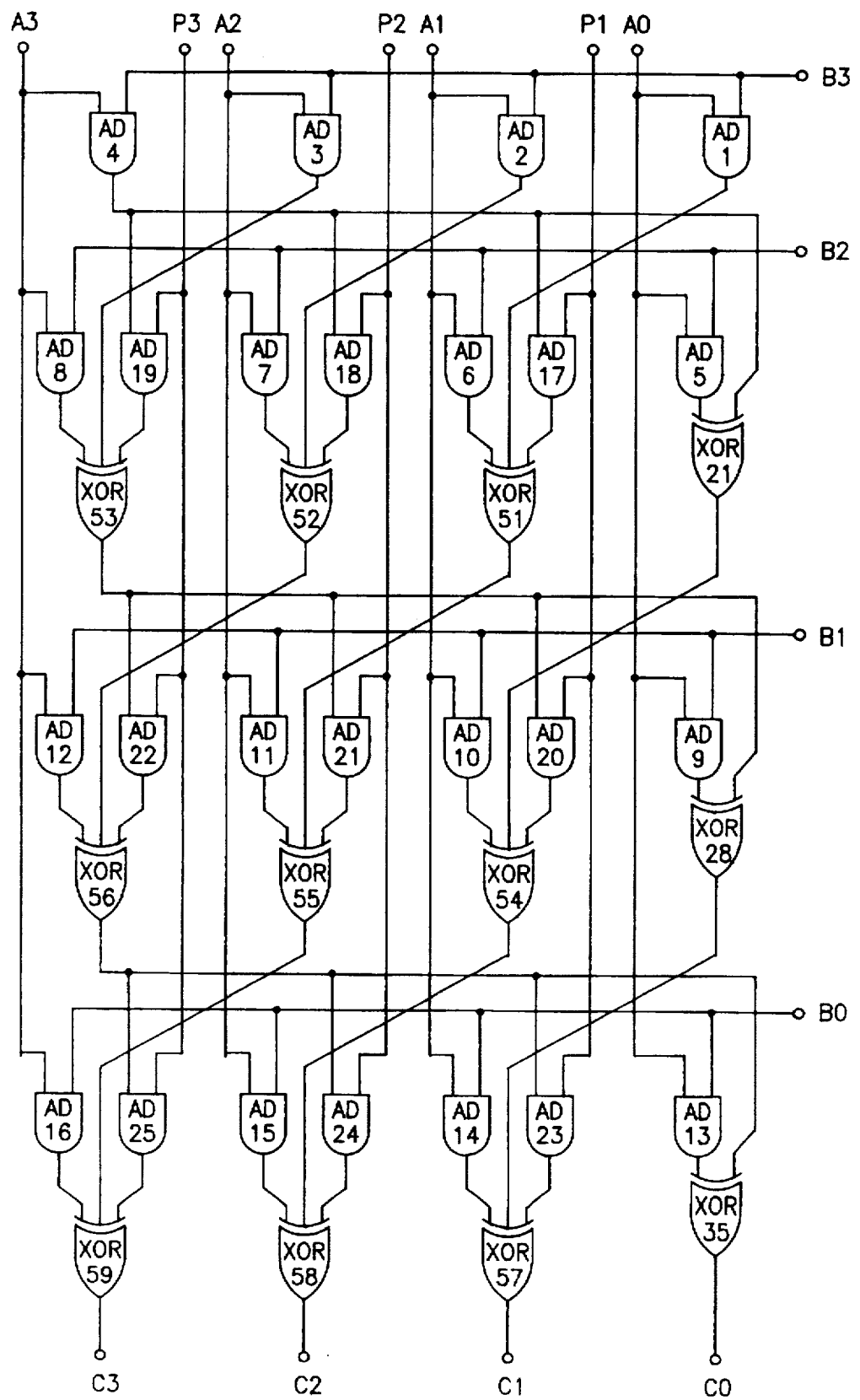
FIG. 3 is a circuit diagram of a universal Galois field multiplier for a Galois field GF(16) according to a second embodiment of the present invention.

Meanwhile, as shown in FIG. 3, a universal Galois field multiplier according to a second embodiment of the present invention includes AND-gates AD1 through AD25 and XOR-gates XOR21, XOR28, and XOR35 which have the same construction of the universal Galois field multiplier as shown in FIG. 2, XOR-gates XOR51 thorough XOR53 for XORing leftwardly rotated output values of the AND-gates AD1 through AD3, output values of AND-gates AD1 through AD3, output values of the AND-gates AD6 through AD8, and output values of the AND-gates AD17 thorough AD19, XOR-gates XOR54 through XOR56 for XORing leftwardly rotated output values of the XOR-gates XOR21 and XOR51 through XOR52, output values of the AND-gates AD10 through AD12, and output values of the AND-gates AD20 through AD22, and XOR-gates XOR57 through XOR59 for XORing leftwardly rotated output values of the XOR-gates XOR28 and XOR54 and XOR55, output values of the AND-gates AD14 through AD16, and output values of the AND-gates AD23 through AD25.

Here, the results of the multiplication of the multiplicand A3, A2, A1 and A0 and the multiplier B3, B2, B1, and B0 are referred to bits C0 through C3 outputted from the XOR-gates XOR35 through XOR57 through XOR59.

The universal Galois field multiplier as shown in FIG. 3 is directed to replacing each pair of two-input XOR-gates with one three-input XOR-gates. For example, the XOR-gates XOR22 and XOR25 as shown in FIG. 2 are substituted with the XOR-gate XOR51 as shown in FIG. 3. Therefore, the universal Galois field multiplier according to the second embodiment of the present invention has the same function and effects as the universal Galois field multiplier as shown in FIG. 2.

Figure 4:
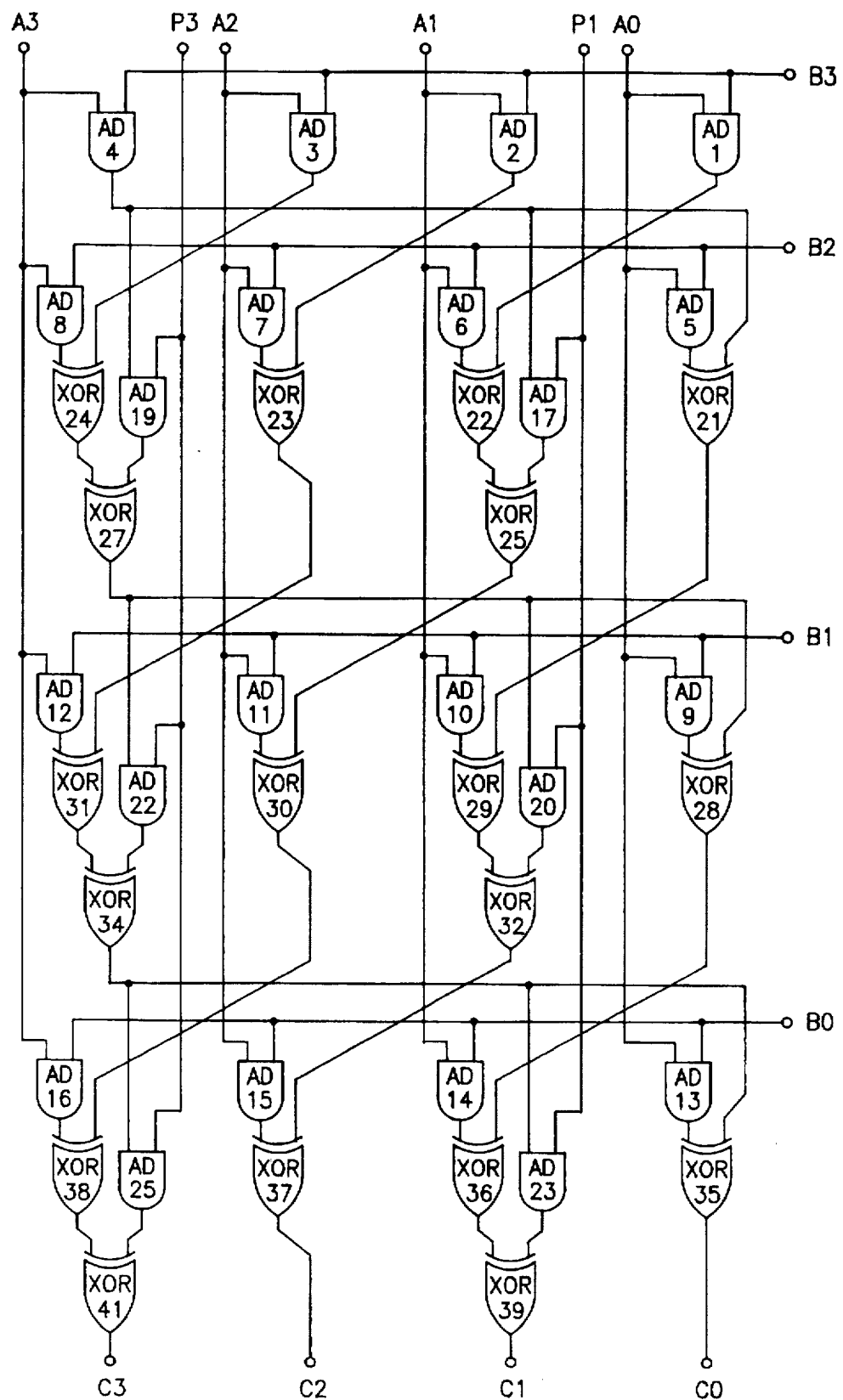
FIG. 4 is a circuit diagram of a universal Galois field multiplier for a Galois field GF(16) according to a third embodiment of the present invention.

Meanwhile, as shown in FIG. 4, a universal Galois field multiplier according to a third embodiment of the present invention does not include AND-gates AD18, AD21, and AD24 positioned at a row corresponding to a bit A2 of a multiplicand of a universal Galois field multiplier as shown in FIG. 2 and XOR-gates XOR26, XOR33, and XOR40 which are adapted in the first embodiment of the present invention.

Therefore, the values of a coefficient $P_2$ of the generating polynomial G5(X) is not inputted, and the XOR-gate XOR23 is connected to the XOR-gate XOR31, and the XOR-gate XOR30 is connected to the XOR-gate XOR38, and the XOR-gate XOR37 outputs a bit C2 as a result of the multiplication.

Two generating polynomials G3(X) (G3(X)=$X^4$+X+1) and G4(X) (G4(X)=$X^4$+$X^3$+1) which define a Galois field GF(16) have a common term of $X^2$ having a coefficient value of zero (0). In addition, the generating polynomial G5(X) (G5(X)=$X^4$+$P^3X^3$+$P_2X^2$+$P_1X$+1) has a term of $X^2$ having a coefficient $P_2$. The coefficient $p^2$ is operated at a predetermined row corresponding to a bit A2 of a multiplicand.

In the universal Galois field multiplier, when a coefficient $P_2$ of a value of zero (0) is inputted, the AND-gates AD18, AD21, and AD24 output zero, respectively, and the XOR-gate XOR26 transfers an output of the XOR-gate XOR23 to the XOR-gate XOR31, and the XOR-gate XOR33 transfers an output value of the XOR-gate XOR30 to the XOR-gate XOR38, and the XOR-gate XOR40 transfers an output value of the XOR-gate XOR37 as a value of a bit C2.

As a result, when the coefficient $P_2$ has a value of zero (0), the AND-gates AD18, AD21, and AD24 and the XOR-gates XOR26, XOR33, and XOR40 of FIG. 2 are excluded from the Galois field multiplier as shown in FIG. 4. Therefore, the universal Galois field multiplier as shown in FIG. 4 has the same functions as a universal Galois field multiplier as shown in FIG. 2 where $P_2$=0.

However, in a predetermined Galois field GF($2^n$), a downsizing of a circuit such as a universal Galois field multiplier as shown in FIG. 4 is not always possible.

Figure 5:
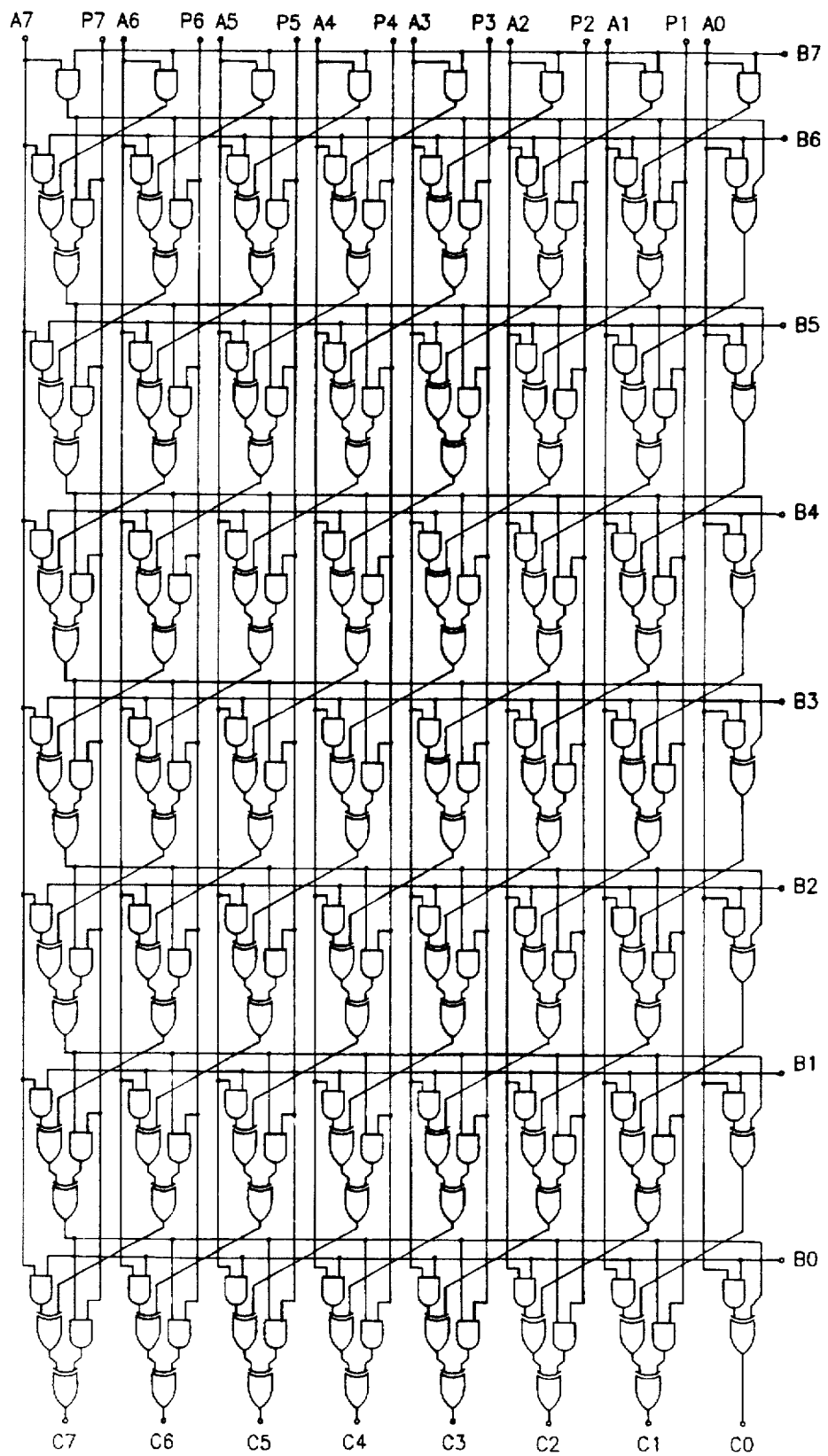
FIG. 5 is a circuit diagram of a universal Galois field multiplier for a Galois field GF(256) according to a fourth embodiment of the present invention.

A universal Galois field multiplier according to a fourth embodiment of the present invention, as shown in FIG. 5, is directed to extending the universal Galois field multiplier as shown in FIG. 2, to a predetermined circuit for a multiplication of eight(8) bits and includes AND-gates and XOR-gates connected to each other in the same manner as the universal Galois field multiplier as shown in FIG. 2.

That is, the universal Galois field multiplier according to the fourth embodiment of the present invention is directed to receiving the remaining terms $X^7$, $X^6$, $X^5$, $X^4$, $X^3$, $X^2$, and $X$, (except for the multiplicands A7, A6, A5, A4, A3, A2, A1, and A0 and the multipliers B7, B6, B5, B4, B3, B2, B1, and B0 which are two elements of the Galois field GF(256) which is defined by a predetermined generating polynomial G8(X) (G8(X) $=X^8+P_7X^7+P_6X^6+P_5X^5+P_4X^4+P_3X^3+P_2X^2+P_1X+1$), and the highest order term $X^8$ and the lowest order term 1 in the generating polynomial G6(X), and directed to outputting bits C0 through C7 as the result of the multiplication.

In addition, the Galois field multiplier as shown in FIG. 5 can embody a Galois field multiplier corresponding to a generating polynomial G1(X) (G1(X)$=X^8+X^4+X^3+X^2+1$) and a generating polynomial G2(X) (G2(X)$=X^8+X^7+X^2+X+1$) in accordance with coefficients $P_7$, $P_6$, $P_5$, $P_4$, $P_3$, $P_2$, and $P_1$.

However, when the universal Galois field multiplier according to the present invention can be used in a universal processor for an error correction code, a coefficient value of a generating polynomial should be stored in the system.

Figure 6:
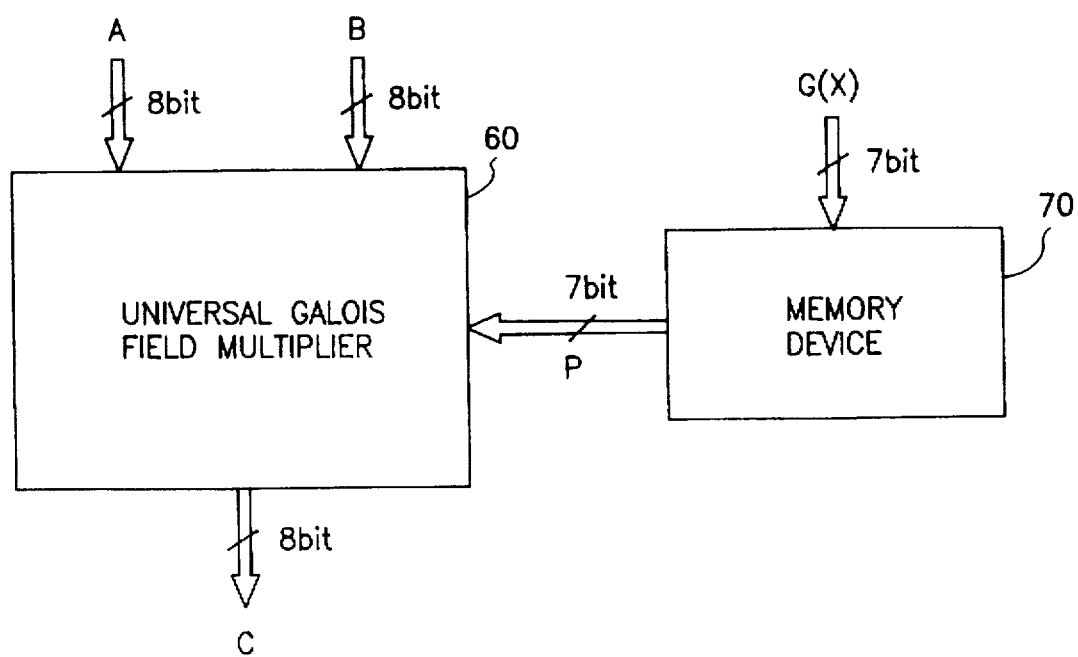
FIG. 6 is a block diagram of a memory device connected to a universal Galois field multiplier and a universal Galois field multiplier of FIGS. 2 through 5.

Therefore, the universal Galois field multiplier 60 according to the present invention, as shown in FIG. 6, stores a coefficient P of a generating polynomial G(X), and is connected to a memory device 70 for applying the stored coefficient P to the universal Galois field multiplier 60.

The above-mentioned memory device 70 needs an initialization process, and a multiplication operation is performed in a Galois field which is defined by the thusly initialized generating polynomial. In addition, the generating polynomial G(X) can be applied to the memory device 20 in an externally changed state, so that the universal Galois field multiplier 60 can perform a multiplication in a Galois field which is defined by any type of a generating polynomial.

As described above, the universal Galois field multiplier is directed to storing a predetermined coefficient of a generating polynomial in a memory device, and providing AND-gates for operation to read stored coefficient and XOR-gates which become effective in accordance with an output of the AND-gates, so that the universal Galois field multiplier can be universally used in a microprocessor or a digital signal processor.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A universal Galois field multiplier, comprising:
a first operation unit including first AND-gates for ANDing a corresponding bit value of a multiplicand and a most significant bit value of a multiplier; and
a plurality of second operation units connected to the first operation unit or a preceding operation unit for logically operating upon a bit value of a multiplicand and the second most significant bit to a least significant bit, respectively, of the multiplier in accordance with coefficient values of a generating polynomial which defines a Galois field, said second operation unit including:
second AND-gates each for ANDing a corresponding bit value of the multiplicand and one bit value among the remaining bits of the multiplier;
first XOR-gates each for XORing a leftwardly rotated output value of the second AND-gates and a corresponding output value of the preceding operation unit;
third AND-gates each for ANDing the corresponding coefficient value of the generating polynomial and a most significant bit value among the output values of the preceding operation unit; and
second XOR-gates for XORing output values of the third AND-gates and the first XOR-gates, wherein the second XOR-gates become effective in accordance with outputs of the third AND-gates.

2. The multiplier of claim 1, wherein said second XOR-gates are connected to first XOR-gates and third AND-gates except for the first XOR-gate corresponding to the least significant bit among the first XOR-gates.

3. The multiplier of claim 1, wherein said universal Galois field multiplier is connected to a memory device which receives the generating polynomial, stores the coefficients of the inputted generating polynomial, and outputs the coefficients to the second operation units.

4. A universal Galois field multiplier, comprising:
a first operation unit including first AND-gates for ANDing a corresponding bit value of a multiplicand and a most significant bit value of a multiplier; and
a plurality of second operation units connected to the first operation unit or a preceding operation unit for logically operating upon a bit value of a multiplicand and the second most significant bit to a least significant bit, respectively, of the multiplier in accordance with coefficient values of a generating polynomial which defines a Galois field, said second operation unit including:
second AND-gates each for ANDing a corresponding bit value of the multiplicand and one bit value among the remaining bits of the multiplier;
a first XOR-gate for XORing an output value of a second AND-gate among the second AND-gates and an output value of a preceding operation unit which is leftwardly rotated;
third AND-gates for ANDing a coefficient value of the generating polynomial, and a most significant bit value among output values of the predetermined operation unit; and
second XOR-gates each for XORing a corresponding output value of the third AND-gates, a corresponding output value of the second AND-gates, and a corresponding output value of a preceding operation unit which is leftwardly rotated.

5. The multiplier of claim 4, wherein said XORing gate XOR's an output value of a preceding operation unit which is leftwardly rotated, and a least significant value among output values of the second AND-gates.

6. The multiplier of claim 4, wherein said universal Galois field multiplier is connected to a memory device which receives the generating polynomial, stores the coefficients of the inputted generating polynomial, and outputs the coefficients to the second operation units.

7. A universal Galois field multiplier, comprising:
a first operation unit including first AND-gates for ANDing a corresponding bit value of a multiplicand and a most significant bit value of a multiplier; and a plurality of second operation units connected to the first operation unit or a preceding operation unit for logically operating upon a bit value of a multiplicand and the second most significant bit to a least significant bit, respectively, of the multiplier in accordance with coefficient values of a generating polynomial which defines a Galois field, said second operation unit including:

second AND-gates each for ANDing a corresponding bit value of the multiplicand and one bit value among the remaining bits of the multiplier;

first XOR-gates each for XORing a corresponding leftwardly rotated output value of the second AND-gates and a corresponding output value of the preceding operation unit;

third AND-gates for ANDing a corresponding coefficient value of a generating polynomial and a most significant bit value among output values of a preceding operation unit when at least one term among opposing terms of generating polynomials which define a Galois field has a coefficient value of one (1); and second XOR-gates for XORing output values of the third AND-gates and the first XOR-gates, wherein the second XOR-gates become effective in accordance with outputs of the third AND-gates.

8. The multiplier of claim 7, wherein said first XOR-gate are directed to outputting a leftwardly rotated output value to a following operation unit when the third AND-gates corresponding to the first XOR-gates are not present.

9. The multiplier of claim 7, wherein said universal Galois field multiplier includes a memory device which receives a generating polynomial, stores coefficients of the inputted generating polynomial, and outputs the coefficients to a universal Galois field multiplier.

10. The multiplier of claim 7, wherein said generating polynomial is one of G3(X) (G3(X)=$X^4+X+1$) and G4(X) (G4(X)=$X^4+X^3+1$) which define a Galois field GF(16).

11. A reconfigurable Galois field multiplier comprising:

zeroith to $n^{th}$ power means for using at least one logical gate to represent a zeroith to $n^{th}$ power of a variable, X, respectively, in a first polynomial $f_1(X)=1+k_1X+k_2X^2+k_3X^3+\ldots k_{n-1}X^{n-1}+X^n$, where n is an integer and n>1, where $k_j$ is an integer equal to one or zero, and where j is an integer and j=1, 2, . . . (n–1); and first to $(n-1)^{th}$ coefficient means for selectively setting said coefficients $k_1, k_2, k_3, \ldots k_{n-1}$ at a value of either one or zero to selectively nullify an effect of said first to $(n-1)^{th}$ power means so as to achieve multiplication according to a second polynomial having the same or fewer terms than said polynomial $f_1(X)$.

12. The reconfigurable Galois field multiplier as in claim 11, wherein n=8, said first polynomial $f_1(X)=1+k_1X+k_2X^2+k_3X^3+k_4X^4+k_5X^5+k_6X^6+k_7X^7+X^8$, and said first to $(n-1)^{th}$ coefficient means are operable to selectively nullify terms of $f_1(X)$ so that said second polynomial is $f_2(X)=1+X+X^2+X^7+X^8$.

13. The reconfigurable Galois field multiplier as in claim 11, wherein n=8, said first polynomial $f_1(X)=1+k_1X+k_2X^2+k_3X^3+k_4X^4+k_5X^5+k_6X^6+k_7X^7+X^8$, and said first to $(n-1)^{th}$ coefficient means are operable to selectively nullify terms of $f_1(X)$ so that said second polynomial is $f_2(X)=1+X^2+X^3+X^4+X^8$.

14. The reconfigurable Galois field multiplier as in claim 11, wherein n=4, said first polynomial $f_1(X)=1+k_1X+k_2X^2+k_3X^3+X^4$, and said first to $(n-1)^{th}$ coefficient means are operable to selectively nullify terms of $f_1(X)$ so that said second polynomial is $f_2(X)=1+X^3+X^4$.

15. The reconfigurable Galois field multiplier as in claim 11, wherein n=4, said first polynomial $f_1(X)=1+k_1X+k_2X^2+k_3X^3+X^4$, and said first to $(n-1)^{th}$ coefficient means are operable to selectively nullify terms of $f_1(X)$ so that said second polynomial is $f_2(X)=1+X+X^4$.

16. The reconfigurable Galois field multiplier as in claim 11, further comprising a memory for storing values of said coefficients $k_1, k_2, k_3, \ldots k_{n-1}$, said first to $(n-1)^{th}$ coefficient means being operable according to said coefficients $k_1, k_2, \ldots k_{n-1}$ stored in said memory.

* * * * *